United States Patent
You

(10) Patent No.: US 7,591,512 B2
(45) Date of Patent: Sep. 22, 2009

(54) GUIDE ANCHOR FOR SEAT BELT OF VEHICLE AND METHOD FOR MANUFACTURING THE SAME

(75) Inventor: Byoung-Gae You, Wonju-si (KR)

(73) Assignee: Delphi Korea Corporation (KR)

( * ) Notice: Subject to any disclaimer, the term of this patent is extended or adjusted under 35 U.S.C. 154(b) by 4 days.

(21) Appl. No.: 11/834,582

(22) Filed: Aug. 6, 2007

(65) Prior Publication Data

US 2008/0018165 A1 Jan. 24, 2008

Related U.S. Application Data

(63) Continuation of application No. 11/175,928, filed on Jul. 6, 2005.

(30) Foreign Application Priority Data

Jul. 29, 2004 (KR) .......................... 10-2004-59676
Jul. 29, 2004 (KR) .......................... 10-2004-59678
May 17, 2005 (KR) .......................... 10-2005-41311

(51) Int. Cl.
*B60R 22/00* (2006.01)
*B60R 22/48* (2006.01)

(52) U.S. Cl. ................ 297/482; 280/801.1; 280/808
(58) Field of Classification Search ............... 297/462, 297/482, 463.1, 463.2; 280/808, 801.1
See application file for complete search history.

(56) References Cited

U.S. PATENT DOCUMENTS

| | | | |
|---|---|---|---|
| 5,918,903 A * | 7/1999 | Ito | 280/801.1 |
| 6,138,328 A | 10/2000 | Iseki et al. | |
| 6,467,850 B1 * | 10/2002 | Kawai et al. | 297/468 |
| 6,491,347 B2 * | 12/2002 | Iseki | 297/463.1 |
| 6,702,327 B2 * | 3/2004 | Janz | 280/808 |
| 6,715,793 B2 * | 4/2004 | Okubo | 280/808 |
| 6,739,625 B2 * | 5/2004 | Tomita et al. | 280/808 |
| 2001/0043006 A1 | 11/2001 | Iseki | |
| 2002/0093185 A1 | 7/2002 | Koketsu | |

FOREIGN PATENT DOCUMENTS

| | | |
|---|---|---|
| EP | 1275569 | 1/2003 |
| JP | 5-44719 U | 6/1993 |
| JP | 10-095308 | 4/1998 |

(Continued)

OTHER PUBLICATIONS

EP application No. 05076458 Search Report dated Aug. 11, 2005.

*Primary Examiner*—David Dunn
*Assistant Examiner*—Erika Garrett
(74) *Attorney, Agent, or Firm*—Douglas D. Fekete

(57) ABSTRACT

A guide anchor for a seat belt, and a method for manufacturing the same are disclosed. The guide anchor comprises a guide plate having a latching hole and a slide guide hole formed therein, a guide piece engaged with a lower circumference of the slide guide hole, and a first molded part for coupling the guide plate and the guide piece. The guide piece comprises a cover, and a second molded part injected into a lower surface of the cover. The second molded part has a recess formed in a longitudinal direction at a lower surface. The cover has cover eaves extending from a lower portion.

2 Claims, 16 Drawing Sheets

FOREIGN PATENT DOCUMENTS

| | | |
|---|---|---|
| JP | 2001-63517 A | 3/2001 |
| JP | 2001-310702 | 6/2001 |
| JP | 2002-104133 A | 4/2002 |
| JP | 2002-127869 | 5/2002 |
| JP | 2002-211350 | 3/2003 |
| JP | 2003-89345 A | 3/2003 |

* cited by examiner

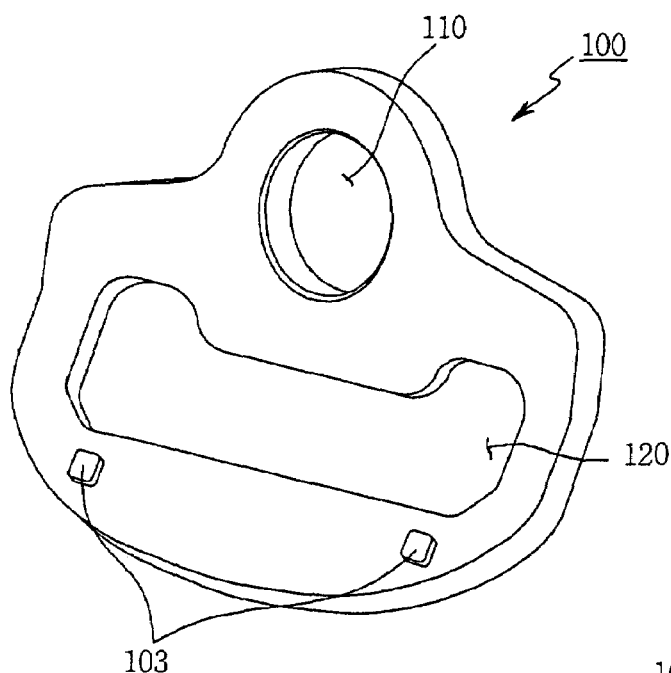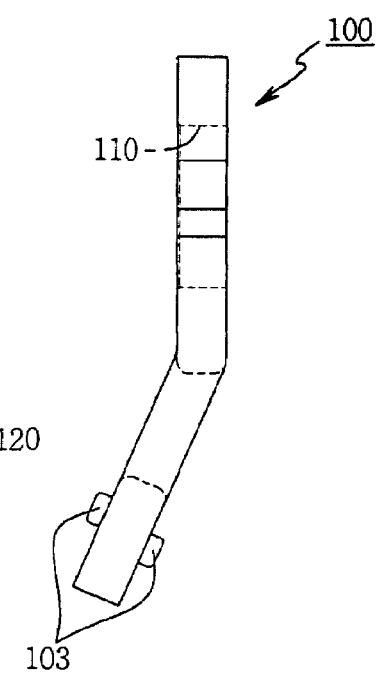
(a)                  (b)
*FIG 5A*          *FIG 5B*

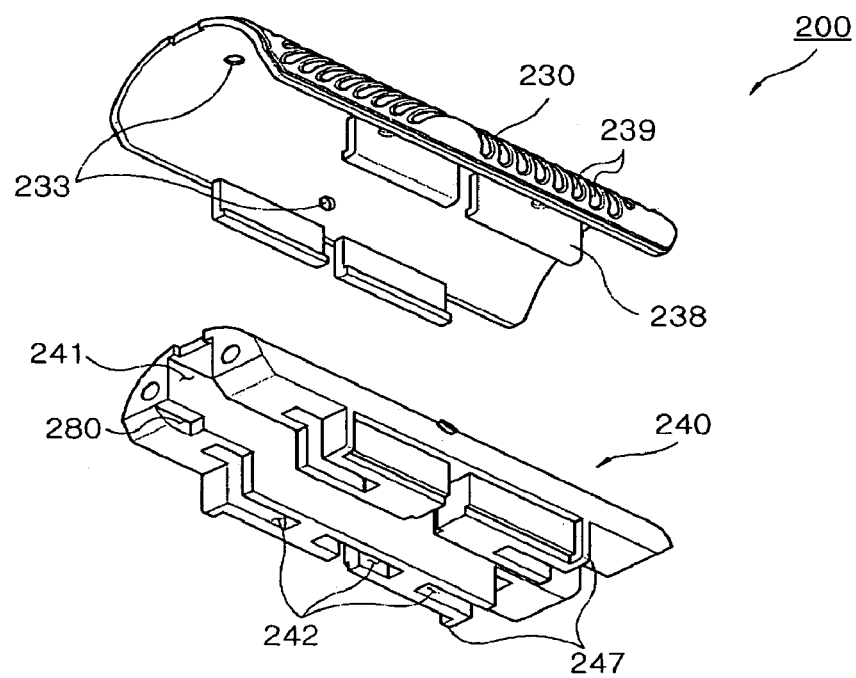
FIG. 8
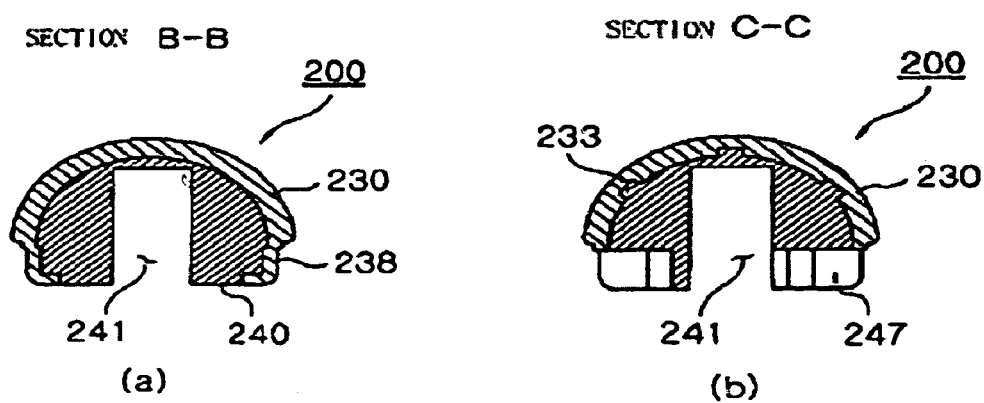
FIG. 9A   FIG. 9B

(a)

(b)

(c)

(d)

US 7,591,512 B2

GUIDE ANCHOR FOR SEAT BELT OF VEHICLE AND METHOD FOR MANUFACTURING THE SAME

This Application is a continuation of U.S. Ser. No. 11/175,928 filed Jul. 6, 2005, which claims priorities from Korean patent application Nos. 10-2004-59676 filed Jul. 29, 2004, 10-2004-59678 filed Jul. 29, 2004, and 10-2005-41311 filed May 17, 2007, the disclosures of which are incorporated herein in their entirety by reference.

FIELD OF INVENTION

The present invention generally relates to a guide anchor for a seat belt of a vehicle, and a method for manufacturing the same. More particularly, the present invention relates to a method for manufacturing a guide anchor for a seat belt, which can remarkably reduce misalignment between components during a molding process and frequency of defective products, and a guide anchor manufactured by the method.

RELATED APPLICATIONS

This application claims the benefit of priority under 35 USC 119 of Korean application number 10-2004-59676, filed Jul. 29, 2004, Korean application number 10-2004-59678, filed Jul. 29, 2004 and Korean application number 10-2005-41311, filed May 17, 2005 the contents of which are herein incorporated by reference.

BACKGROUND

As is well known in the prior art, a seat belt assembly for a vehicle is a device for protecting a passenger during an accident, such as a collision. The seat belt assembly mainly comprises a belt, a guide anchor for guiding the belt, a pillar for supporting the belt and the guide anchor to a vehicle frame, a retractor for holding the passenger in such a manner of fixing the belt instantaneously upon the collision while allowing the belt to move according to a movement of the passenger by restoring force in a normal state, and a free tensioner.

Among these components, the guide anchor is a component equipped to allow the pillar of the vehicle frame to freely shake in forward and backward directions while guiding the belt as it passes through the guide anchor. The guide anchor has numerous constructions according to manufacturers.

FIG. 1 shows a typical construction of a conventional guide anchor. The guide anchor of FIG. 1 is disclosed in Japanese Patent Laid-open Publication No. 2001-63517.

As shown in FIG. 1, the guide anchor comprises a metallic guide plate 11 for supporting a weight, a guide piece 12 through which the belt slides, and a resinous body 6 molded over the guide plate 11 and the guide piece 12 in a fixed state.

Here, since the guide plate 11 is temporarily coupled to the guide piece 12 by resilient press-fitting before injection of resin, there is a high possibility of misalignment between components during molding due to a significantly unstable coupling force.

FIG. 2 shows a construction of another conventional guide anchor. The guide anchor of FIG. 2 is disclosed in Japanese Patent Laid-open Publication No. 2002-104133.

As shown in FIG. 2, the guide anchor comprises a metallic guide plate 2 for supporting a weight, a guide piece 3 through which the belt slides, and a molding part 6 molded over the guide plate 2 and the guide piece 3 in a fixed state.

Molding is performed in a state that the guide piece 3 is temporarily fixed to the guide plate 2 before molding. As a result, it is possible to prevent the guide piece 3 from being separated from the guide plate 2 during molding or conveying. The construction of this guide anchor will be described in detail as follows.

The guide piece 3 is formed at a lower portion with flanges, each having a bent portion. A belt guide 5 of the guide plate 2 is formed with latching protrusions. Thus, when fitting the guide piece 3 into the guide plate 2, the guide piece 3 is resiliently deformed, and is then coupled to the guide plate 2 by wedge effect between the bent portions of the flanges and the latching protrusions, whereby the guide piece 3 can be firmly fixed to the guide plate 2 temporarily.

However, since the latching protrusions must be previously formed on the metallic guide plate 2, there is difficulty in manufacturing the guide anchor. Moreover, since the coupling force between the latching protrusions of the guide plate 2 and the bent portions of the guide piece 3 is insufficient during coupling, there is a possibility of slight misalignment therebetween.

FIG. 3a shows a construction of still another conventional guide anchor. The guide anchor of FIG. 3a is disclosed in Japanese Patent Laid-open Publication No. 2003-89345.

As shown in FIG. 3a, the guide anchor has plural protrusions 25 formed at an angle on a slip surface 24b in order to prevent the belt 23 from being biased upon collision. At this time, a slant angle $\theta_1$ of the protrusions 25 is related to an angle $\theta_b$ of a perforated direction of a guide hole 24a of the belt 23.

FIG. 3b shows a guide anchor disclosed in Japanese Utility Model Laid-open Publication No. (Hei) 5-44719. This guide anchor also has a slant groove 23 formed on a steel guide piece 22 such that a slant angle of the groove 23 is substantially identical to an angle of the belt S.

Although the above disclosures suggest the guide anchors of FIGS. 3a and 3b be constructed by suitably mounting the guide piece to the guide plate and then molding them or by integrally manufacturing the guide piece and the guide plate with metal or resin, detailed process and construction thereof are not illustrated in both disclosures.

SUMMARY OF THE INVENTION

It is an object of the present invention to provide a method for manufacturing a guide anchor for a seat belt, which allows a guide plate and a guide piece to be molded after temporarily fixing the guide plate to the guide piece, thereby reducing misalignment between components during a molding process as well as frequency of defective products, and a guide anchor manufactured by the method.

It is another object of the present invention to provide the guide anchor for the seat belt and the method for manufacturing the same, which allows a cover and a second molded part to be firmly engaged with each other in the guide piece, thereby preventing them from being separated from each other during a final molding process.

In one aspect, the invention includes a guide anchor for a seat belt of a vehicle, the guide anchor comprising a guide plate having a latching hole and a slide guide hole formed therein, a guide piece engaged with a lower circumference of the slide guide hole, and a first molded part for coupling the guide plate and the guide piece, wherein the guide piece comprises a cover and a second molded part formed under a lower surface of the cover, and the second molded part has a recess formed at a lower surface in a longitudinal direction such that the recess is fitted onto the guide plate.

Embodiments of the invention include these in which:

the cover is formed with cover eaves extending from a lower portion of the cover;

each of the cover eaves is either partially or entirely bent inward at a lower end, and supports a lower lateral edge of the second molded part;

both longitudinal ends of the cover eaves and the second molded part are cut to a predetermined length;

both longitudinal ends of the cover eaves contact transverse ribs of the second molded part, and are supported thereby;

the cover has latching grooves formed on a rear side thereof;

the cover has either grooves or protrusions formed on an upper surface thereof such that the grooves or protrusions are formed diagonally to the longitudinal direction of the guide piece;

the grooves or protrusions are symmetrical to each other about a longitudinal center of the guide piece;

protrusions are formed on either the rear or front surface of the guide plate, and the recess of the second molded part of the guide piece is formed at both sides with fitting grooves to which the protrusions are fitted;

the cover is formed with two or more frictional openings such that the second molded part is exposed through the frictional openings;

the cover has a symmetrical shape, and the second molded part is finished at a lower surface of the cover;

side surfaces of the cover have different heights, so that the second molded part is finished in an exposed state at a shorter side of the cover while being finished at a lower surface of a longer side of the cover;

each frictional opening of the cover is slanted to a vertical center line;

each frictional opening of the cover has a rounded circumferential surface;

each frictional opening of the cover has a downwardly bent circumference;

protrusions are formed on a surface of the second molded part exposed through the frictional openings of the cover;

protrusions are extended along a length of the frictional openings of the cover;

protrusions are formed on either rear or front surface of the guide plate, and the recess of the second molded part of the guide piece is formed at both sides with fitting grooves to which the protrusions are fitted;

the second molded part has a recess formed on a lower surface in the longitudinal direction so as to be fitted to the guide plate, the recess being alternately formed with convex portions and depressions in the longitudinal direction on a lower surface thereof, and the slide guide hole of the guide plate being alternately formed at a lower circumference with concave portions and ridges to be fitted to the convex portions and the depressions in the longitudinal direction;

the convex portions and the depressions of the second molded part are tightly fitted into the concave portions and the ridges of the guide plate; and at least a portion of the convex portions of the second molded part is higher than the ridges of the guide plate.

In another aspect, the invention includes a method for manufacturing a guide anchor for a seat belt of a vehicle, the method comprising the steps of: molding a cover; installing the cover into an injection mold, followed by forming a guide piece such that a second molded part is attached to a lower surface of the cover while forming a recess on a lower surface of the second molded part; fitting the guide piece into a lower circumference of a slide guide hole of the guide plate through the recess of the guide piece; and installing an assembly of the guide plate and the guide piece into the injection mold, and forming a first molded part.

Embodiments of the invention include those that include forming frictional openings on a surface of the cover and/or either rounding or downwardly bending a circumferential surface of the frictional opening.

Other embodiments include those in which, when the second molded part is formed by injection under the lower surface of the cover, protrusions are formed at the same time on a portion of the second molded part exposed through the frictional openings of the cover.

BRIEF DESCRIPTION OF THE DRAWINGS

The foregoing and other objects and features of the present invention will be more clearly understood from the following detailed description taken in conjunction with the accompanying drawings, in which:

FIGS. 5a and 5b are a perspective view and a side sectional view illustrating a guide plate of the guide anchor of FIG. 4, respectively;

FIG. 8 is an exploded perspective view illustrating the guide piece of FIG. 7;

FIGS. 9a and 9b are cross-sectional views taken along line B-B and line C-C, illustrating the guide piece of FIG. 7, respectively;

DESCRIPTION OF THE PREFERRED EMBODIMENTS

Preferred embodiments will now be described in detail with reference to the accompanying drawings.

Embodiment 1

In FIGS. 4 to 9, a first embodiment of the present invention is illustrated.

Figure 1:
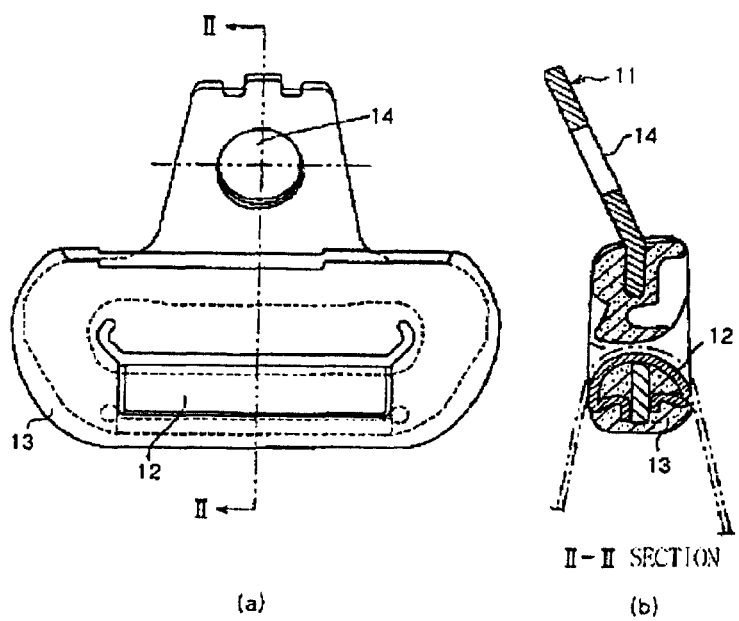
FIG. 1 is a view illustrating one example of a conventional guide anchor for a seat belt.
Figure 2:
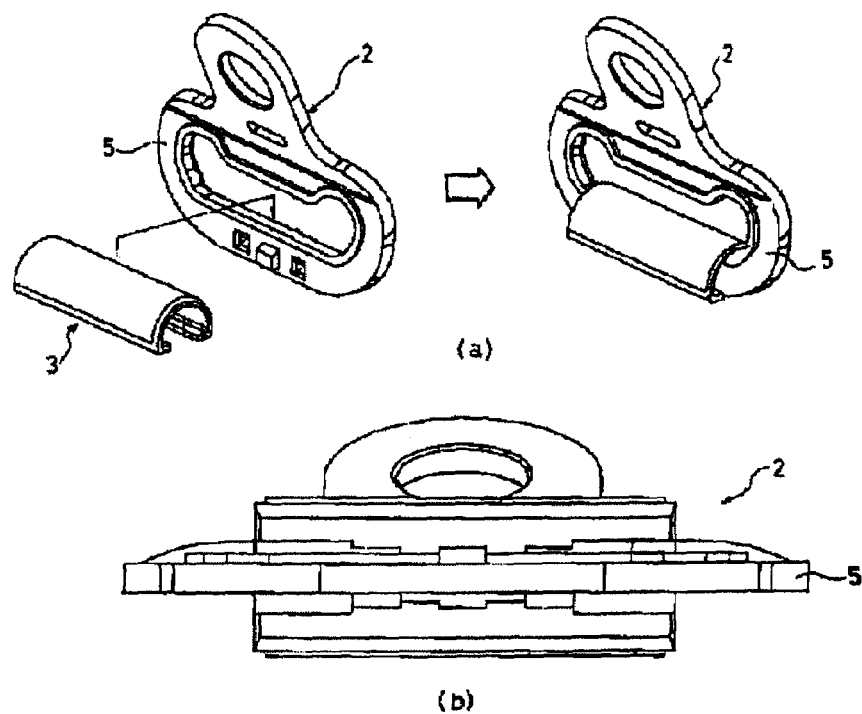
FIG. 2 is a view illustrating another example of the conventional guide anchor for the seat belt.
Figure 3A:
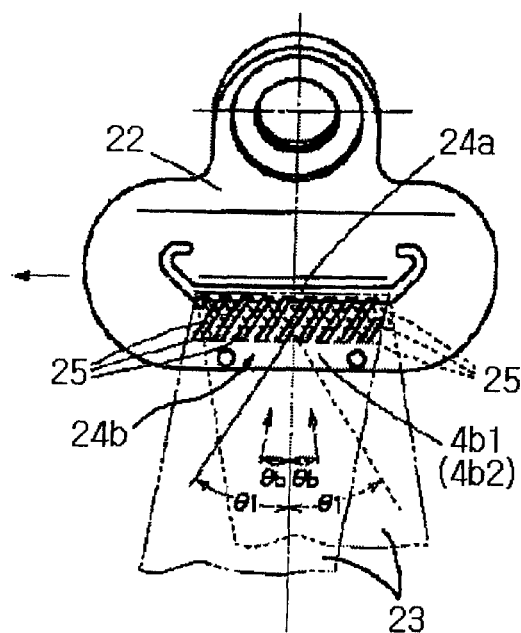
FIGS. 3a and 3b are front views illustrating yet another example of the conventional guide anchor for the seat belt.
Figure 3B:
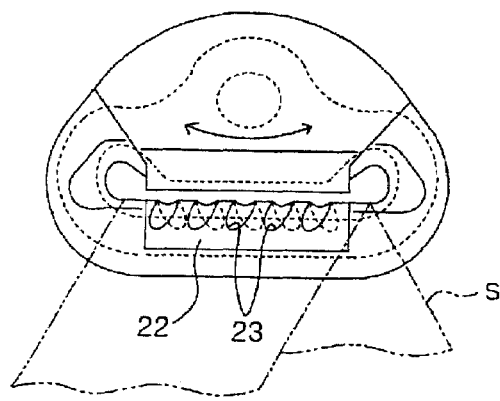
Figure 4:
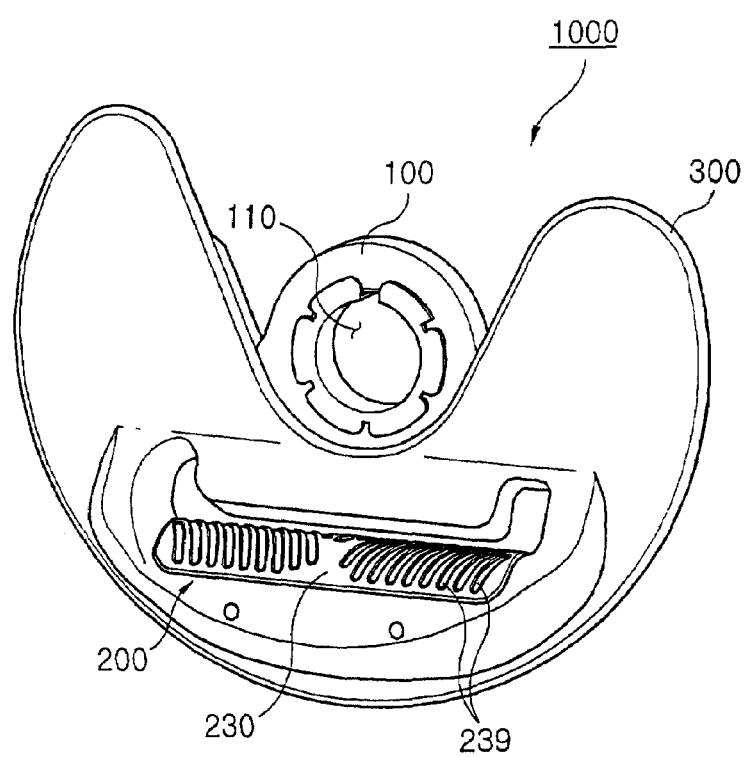
FIG. 4 is a perspective view illustrating a guide anchor for a seat belt in accordance with a first embodiment of the present invention.

As shown in FIG. 4, a guide anchor 1000 for a seat belt of a vehicle comprises a metallic guide plate 100 for supporting a weight of a belt, a guide piece 200 for guiding the belt, and a first molded part 300 composed of a resin for coupling the guide plate 100 and the guide piece 200.

First, as shown in FIG. 5, the guide plate 100 is made from a metallic material. The guide plate 100 has a latching hole 110 formed at an upper portion, and a slide guide hole 120 elongated transversely at a lower portion. The latching hole 110 is latched by a pillar (not shown) fixed to a vehicle frame, and serves to hold the guide anchor 1000 to the vehicle frame. The belt passes through the slide guide hole 120, which has a width greater than that of the seat belt.

Protrusions 103 are formed on front and rear surfaces of the guide plate 100.

Meanwhile, as shown in FIGS. 6 to 10, the guide piece 200 is a component, which is equipped to a lower circumference of the slide guide hole 120 formed at the lower portion of the guide plate 100, and which the seat belt directly contacts and slides through.

The guide piece 200 comprises a cover 230, and a second molded part 240 formed by injecting a resin under a lower surface of the cover 230.

The cover 230 directly contacts the belt, and is thus made from a metallic material such as chrome coated steel which has a predetermined rigidity so as to withstand friction. The surface of the cover 230 is formed with grooves 239 in order to prevent the seat belt from being biased. Alternatively, the surface of the cover 230 may be formed with protrusions instead of the grooves 239.

It is desirable that the grooves 239 or the protrusions be formed diagonally to a length of the guide piece 200. Moreover, it is desirable that the grooves 239 or the protrusions be symmetrically formed about a longitudinal center of the cover 230 so that force from the belt can be uniformly distributed.

Additionally, the second molded part 240 formed by injecting the resin under the lower surface of the cover 230 has a recess 241, which is formed at a lower surface of the second molded part 240 in the longitudinal direction so as to have a width corresponding to a thickness of the lower circumference of the slide guide hole 120 in the guide plate 100. In this case, the recess 241 of the second molded part 240 is adapted to be tightly fitted into the lower circumference of the slide guide hole 120 in the guide plate 100.

Both sides of the recess 241 of the guide piece 200 are formed with fitting grooves 280 engaged with the protrusions 103 of the guide plate 100. As a result of engagement between the protrusions 103 and the fitting grooves 280, the guide piece 200 can be securely prevented from being separated in the longitudinal direction.

Meanwhile, the cover 230 has cover eaves 238 extending downwardly from a lower portion of the cover 230. Since the cover eaves 238 are finally enclosed by the first molded part 300, they cannot be viewed from the outside. Of course, the second molded part 240 also extends downward together with the cover eaves 238, and is maintained in an attached state to the cover eaves 238. Accordingly, more easy and firm engagement between the cover 230 and the first molded part 300 is achieved.

A lower end of each cover eave 238 is inwardly bent to support a lower lateral edge of the second molded part 240. As a result, the second molded part 240 can be securely prevented from being separated from the cover 230 downwardly.

A rear side of the cover 230 is formed with a plurality of latching grooves 233 (in the present embodiment, five latching grooves), thereby more effectively preventing the second molded part 240 in the longitudinal direction.

Moreover, both longitudinal ends of each cover eave 238 and the second molded part 240 are cut to a predetermined length. Accordingly, the guide anchor 1000 can be smoothly rounded at both lower ends thereof while having a reduced size by molding.

Both longitudinal ends of each cover eave 238 contact and support transverse ribs 247 of the second molded part 240, respectively. As a result, the second molded part 240 is prevented from being separated from the cover in the longitudinal direction.

The second molded part 240 is formed at a lower surface with a plurality of movement grooves 242 for allowing easy movement of injected materials.

An exemplary method for manufacturing a guide anchor for a seat belt of a vehicle in accordance with the present embodiment will be described as follows.

First, a plate made from chrome-coated steel is bent by pressing, and is formed into a cover 230 as shown in FIG. 8.

With the cover 230 fixed to a mold (not shown), a resin is injected into a lower surface of the cover 230, thereby forming a second molded part 240. That is, the cover 230 having the second molded part 240 attached thereto is produced. In this case, a recess 241 is also formed at a lower surface of the second molded part 240 so as to have a width corresponding to a thickness of a lower circumference of a slide guide hole 120 in the guide plate 100.

Figure 6:
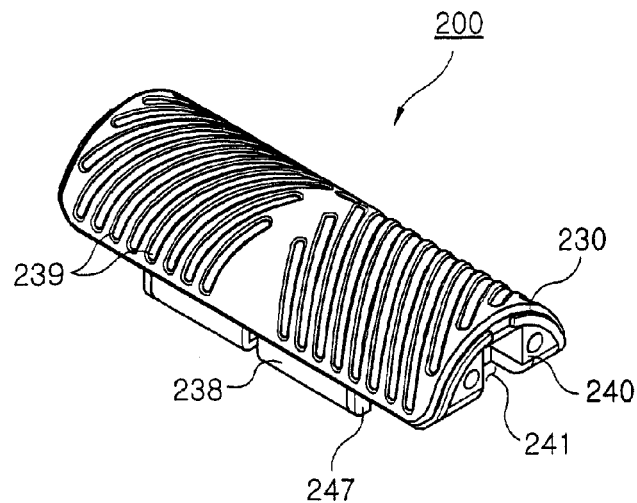
FIG. 6 is a perspective view illustrating a guide piece of the guide anchor of FIG. 4.
Figure 7:
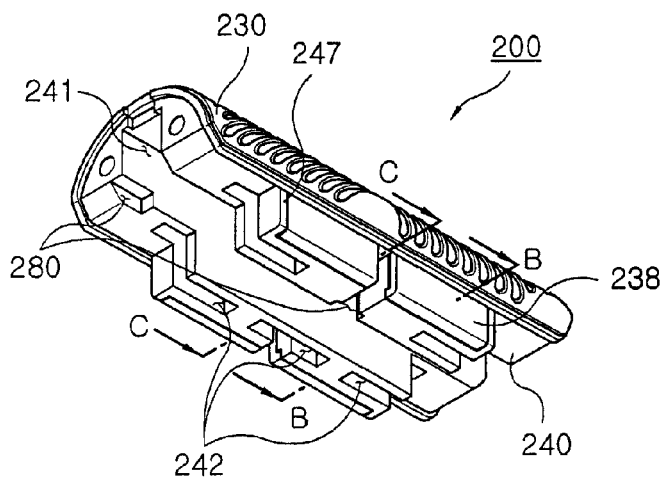
FIG. 7 is a bottom perspective view illustrating the guide piece of the guide anchor of FIG. 4.

As a result, as shown in FIGS. 6 and 7, the cover 230 and the second molded part 240 are integrated to form a guide piece 200.

Figure 10:
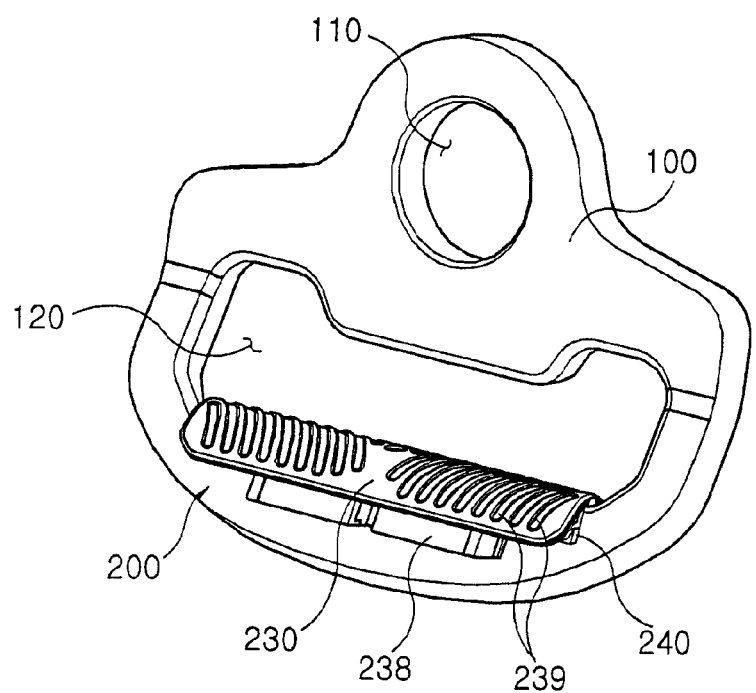
FIG. 10 is a perspective view illustrating the construction of the guide anchor before molding in accordance with the first embodiment, in which the guide piece is coupled to the guide plate.

Then, as shown in FIG. 10, the recess 241 of the second molded part 240 is fitted into a lower circumference of the slide guide hole 120 in the guide plate 100. At this time, latching grooves 233 of the guide piece 200 are fitted onto protrusions 103 of the guide plate 100, thereby preventing misalignment between the guide plate 100 and the guide piece 200.

Finally, with the assembly of the guide plate 100 and the guide piece 200 installed into the mold, injection molding is performed to form a first molded part 300, thereby providing a final product.

Embodiment 2

In FIGS. 10 to 16, a second embodiment of the present invention is illustrated.

Figure 11:
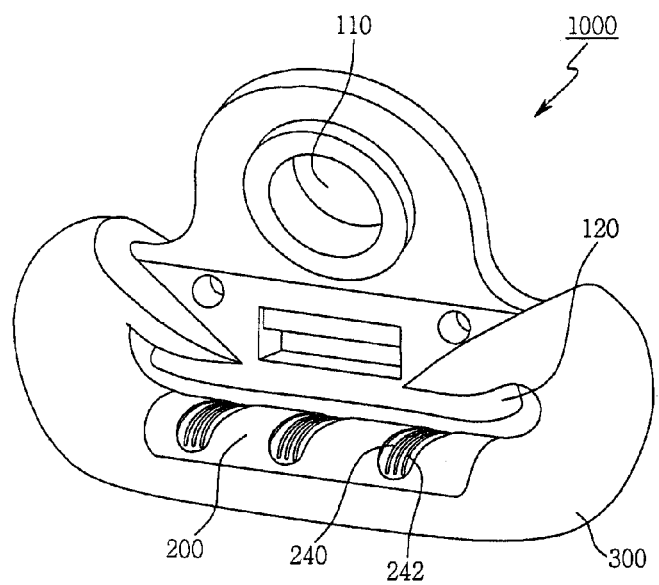
FIG. 11 is a perspective view illustrating a guide anchor for a seat belt in accordance with a second embodiment of the present invention.
Figure 12:
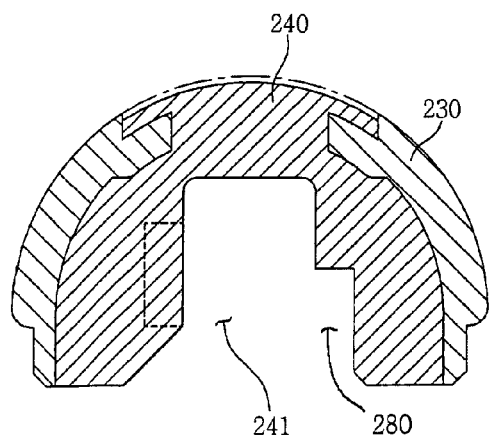
FIG. 12 is a transverse cross-sectional view illustrating a guide piece coupled to a guide plate of the guide anchor of FIG. 11.

As shown in FIG. 11, a guide anchor 1000 for a seat belt of a vehicle comprises a guide plate 100 for supporting a weight of a belt, a guide piece 200 for guiding the belt, and a first molded part 300 composed of a resin for coupling the guide plate 100 and the guide piece 200.

First, as shown in FIG. 11, the guide plate 100 is made from a metallic material. The guide plate 100 has a latching hole 110 formed at an upper portion, and a slide guide hole 120 elongated in a transverse direction at a lower portion. The latching hole 110 is latched by a pillar (not shown) fixed to a vehicle frame, and serves to hold the guide anchor 1000 to the vehicle frame. The belt passes through the slide guide hole 120, which is required to have a width greater than that of the seat belt.

Protrusions 103 are formed on front and rear surfaces of the guide plate 100.

Meanwhile, as shown in FIGS. 12 to 16, the guide piece 200 is a component which is equipped to a lower circumference of the slide guide hole 120 formed at the lower portion of the guide plate 100, and which the seat belt directly contacts and slides through.

The guide piece 200 comprises a cover 230 having two or more frictional openings slanted to a vertical central line, and a second molded part 240 formed by injecting a resin under a lower surface of the cover 230. Of course, the cover 230 need not have the frictional openings.

The cover 230 directly contacts the belt, and is thus made from a metallic material such as chrome coated steel which has a predetermined rigidity.

The second molded part 240 formed by filling the resin under the lower surface of the cover 230 has a recess 241, which is formed at a lower surface of the second molded part 240 in the longitudinal direction so as to have a width corresponding to a thickness of the lower circumference of the slide guide hole 120 in the guide plate 100. In this case, the recess 241 of the second molded part 240 is adapted to be tightly fitted into the lower circumference of the slide guide hole 120 in the guide plate 100. Additionally, the guide piece 200 is formed with fitting grooves 280, which will be engaged with the protrusions 103 of the guide plate 100.

Figure 14A:
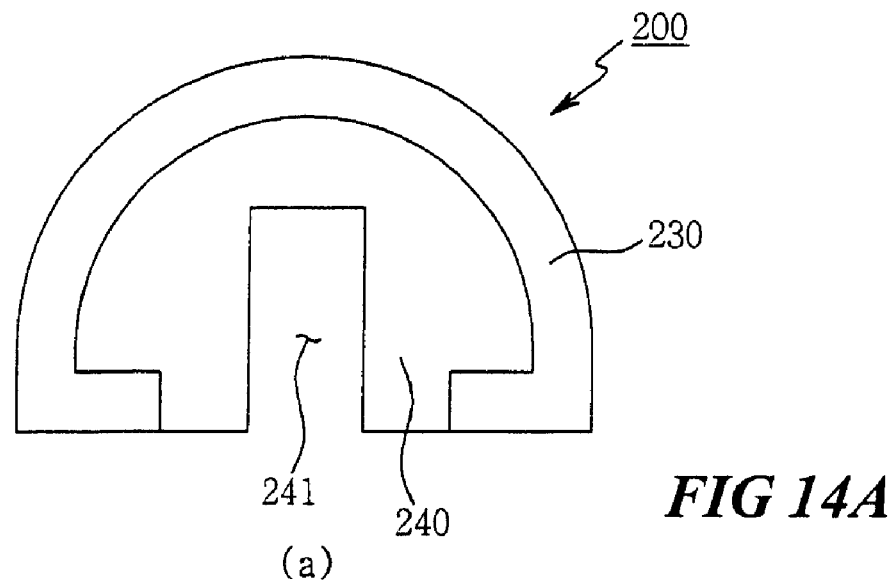
FIGS. 14a and 14b are cross-sectional views illustrating other embodiments of the guide piece of FIG. 13.
Figure 14B:
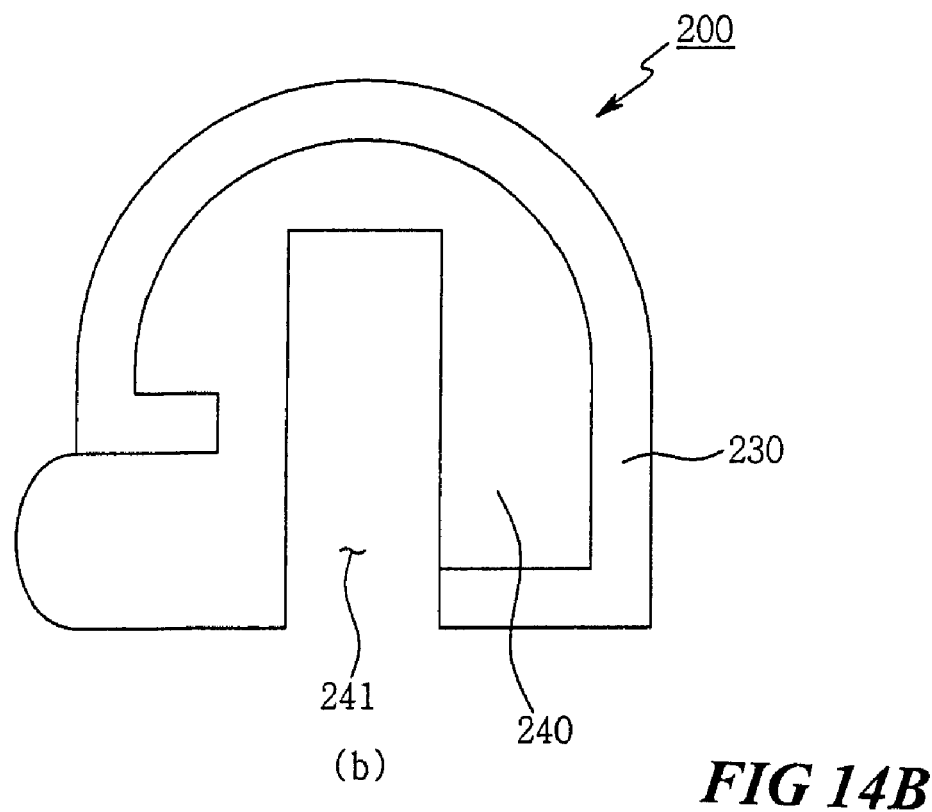

When viewed from a cross section of the guide piece 200, two exemplary structures of the guide piece are shown in FIGS. 14a and 14b.

First, the guide piece 200 shown in FIG. 14a comprises the cover 230 of a symmetrical cross section, and the second molded part 240 finished at a lower surface of the cover.

Second, the guide piece 200 shown in FIG. 14b comprises the cover 230, side surfaces of which have different heights such that the second molded part is finished in an exposed state at the shorter side of the cover while being finished at a lower surface of a longer side of the cover. Accordingly, the guide anchor is adapted such that the seat belt contacts both the cover 230 and the second molded part 240 upon collision. In this manner, it is possible to further reduce a tendency of the belt to bias towards one side upon collision since a frictional force of the belt is increased by the second molded part.

Additionally, as shown in FIGS. 13a to 13d, it is desirable that a circumferential surface of each frictional opening 231 of the cover 230 be machined or shaped before the second molded part 240 is formed by injection of the resin, thereby reducing damage of the belt.

Figure 15A:
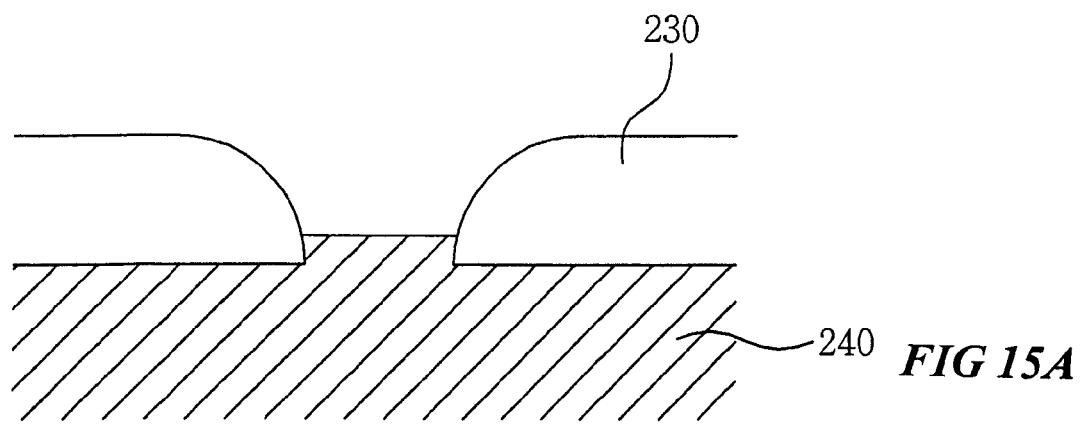
FIGS. 15a and 15b are cross-sectional views illustrating other embodiments of the guide piece of FIG. 13.

For this purpose, as shown in FIG. 15a, the circumferential surface of the frictional opening 231 of the cover 230 is rounded. This can be achieved by grinding that portion using a suitable tool.

Figure 15B:
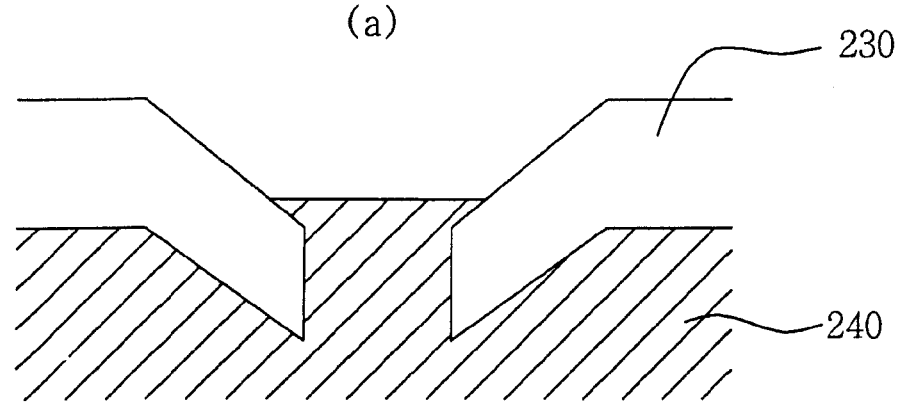

Alternatively, as shown in FIG. 15b, the circumference of the frictional opening 231 of the cover 230 may be bent downwardly. This can be achieved by punching after forming a concave shape on the cover on a press machine.

Figure 16:
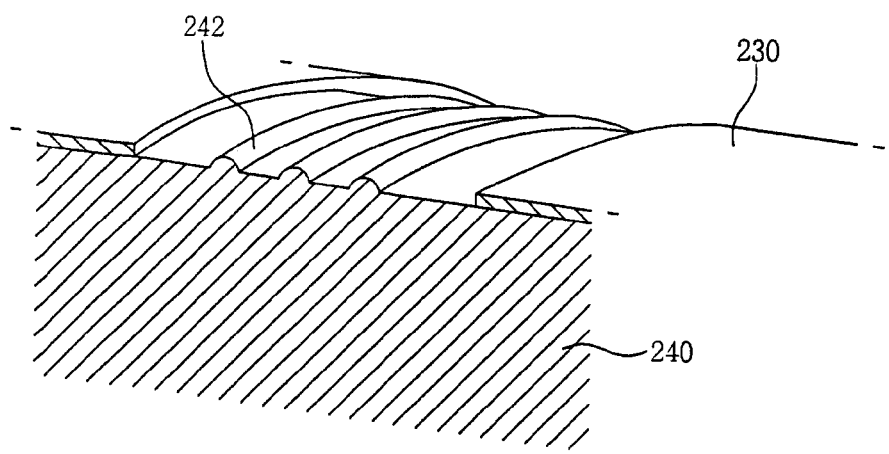
FIG. 16 is a perspective view illustrating a surface of the guide piece of FIG. 13.

Additionally, as shown in FIG. 16, the surface of the second molded part 240 exposed through the frictional opening 231 of the cover 230 is formed with a plurality of protrusions 242. The protrusions 242 extend in the longitudinal direction of the frictional opening 231, and serve primarily to absorb impact in such a manner of being demolished by a load generated upon collision.

A rear surface of the cover 230 is formed with grooves, thereby more effectively preventing the second molded part 240 from being separated in the longitudinal direction.

An exemplary method for manufacturing the guide anchor for the seat belt in accordance with the present embodiment will be described as follows with reference to FIGS. 13a to 13d.

Figure 13A:
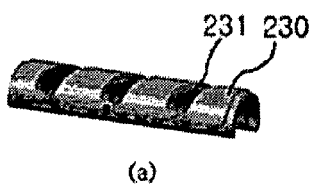
FIGS. 13a to 13d are step diagrams illustrating a method for manufacturing the guide anchor for the seat belt of FIG. 11.

As shown in FIG. 13a, a plate made from chrome-coated steel is bent and punched by pressing to form a cover 230 having two or more frictional openings 231 slanted to the vertical center line.

Figure 13B:
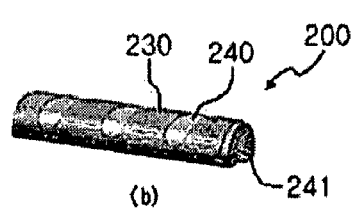

As shown in FIG. 13b, with the cover 230 fixed to a mold (not shown), a resin is injected into a lower surface of the cover 230, thereby forming a second molded part 240. That is, the cover 230 having the second molded part 240 attached thereto is produced. In this case, a recess 241 is also formed at the same time at a lower surface of the second molded part 240 so as to have a width corresponding to a thickness of a lower circumference of a slide guide hole 120 in the guide plate 100.

The cover 230 and the second molded part 240 are integrated to form a guide piece 200.

Figure 13C:
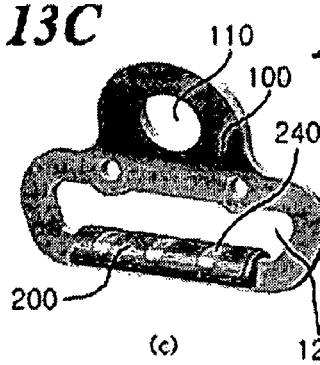

Then, as shown in FIG. 13c, the recess 241 of the second molded part 240 is fitted into the lower circumference of the slide guide hole 120 in the guide plate 100. As a result, misalignment between the guide plate 100 and the guide piece 200 can be substantially prevented during a subsequent injection molding process.

Figure 13D:
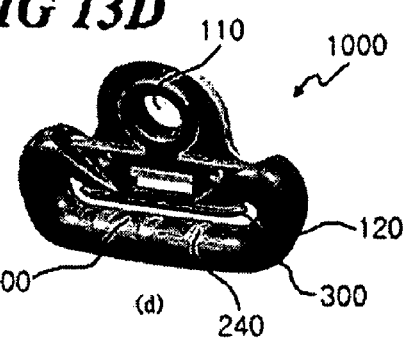

Finally, as shown in FIG. 13d, with the assembly of the guide plate 100 and the guide piece 200 installed into the mold, injection molding is performed to form a first molded part 300, thereby providing a final product.

Embodiment 3

Figure 17A:
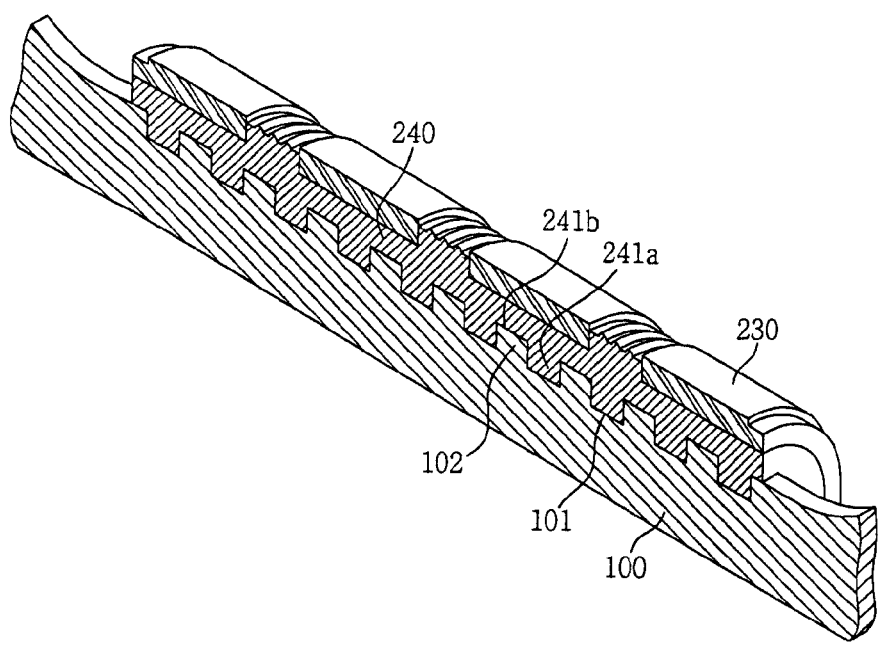
FIG. 17a is a cross-sectional perspective view illustrating an engagement structure between a guide piece and a guide plate of a guide anchor in accordance with a third embodiment of the present invention.
Figure 17B:
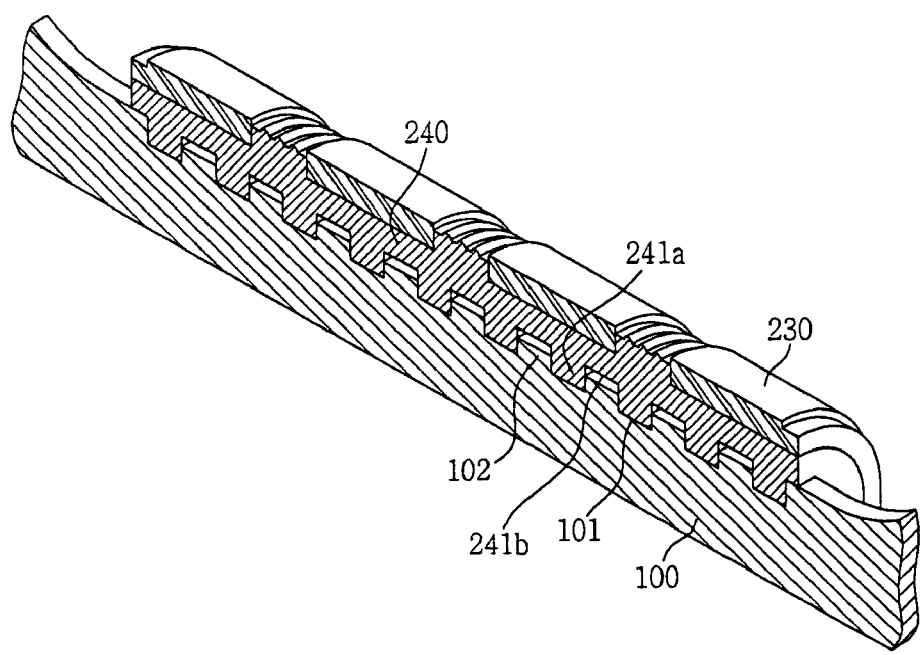
FIG. 17b is a cross-sectional perspective view illustrating another engagement structure between the guide piece and the guide plate of the guide anchor in accordance with the third embodiment of the present invention.
Figure 17C:
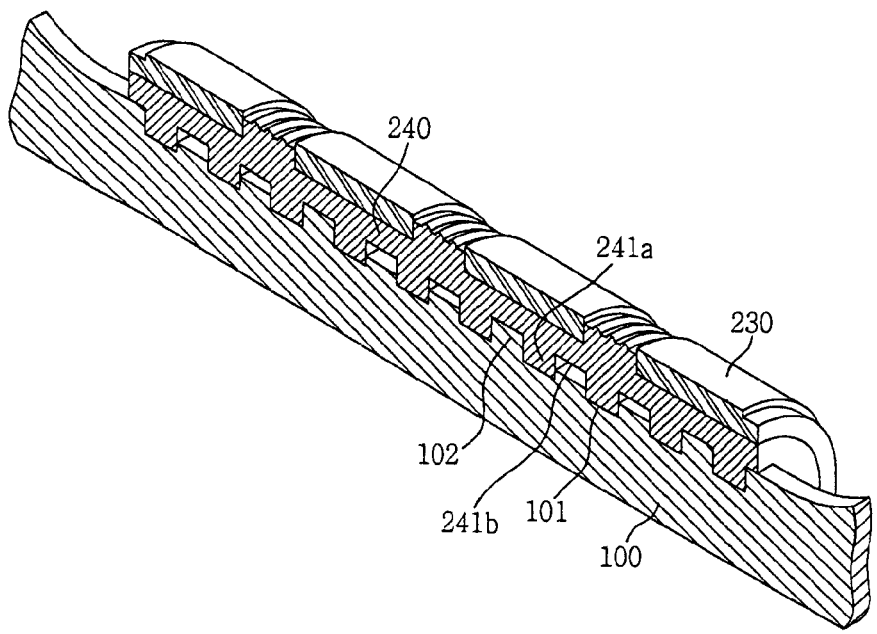
FIG. 17c is a cross-sectional perspective view illustrating yet another engagement structure between the guide piece and the guide plate of the guide anchor in accordance with the third embodiment of the present invention.

In FIGS. 17a to 17c, engagement structures between a guide piece and a guide plate of a guide anchor in accordance with embodiments of the present invention are illustrated.

As shown in the drawings, the recess 241 formed to the lower surface of the second molded part 240 is alternately formed at a lower surface of the recess 241 with convex portions 241a and depressions 241b in the longitudinal direction. Additionally, the slide guide hole 120 of the guide plate 100 is alternately formed at a lower circumference of the hole 120 with concave portions 101 and ridges 102 in the longitudinal direction so as to be fitted into the convex portions 241a and the depressions 241b, respectively.

At this time, as shown in FIG. 17a, the convex portions 241a and the depressions 241b formed on the lower surface of the recess 241 of the second molded part 240 are tightly fitted into the concave portions 101 and the ridges 102 of the guide plate 100 without creating any gap therebetween, respectively.

As shown in FIG. 17b, the convex portions 241a of the second molded part 240 may be taller than the ridges 102 of the guide plate 100, thereby allowing a gap to be created therebetween. In this case, the convex portion 241a of the second molded part 240 is partially demolished upon collision, thereby absorbing the impact.

Alternatively, as shown in FIG. 17c, the convex portion 241a of the second molded part 240 may have a uniform height, whereas the ridges 102 of the guide plate 100 may have non-uniform heights.

Moreover, a rear side of the cover 230 is formed with grooves, thereby more effectively preventing the second molded part 240 from being separated in the longitudinal direction.

Although the recess 241 formed on the lower surface of the second molded part 240 has a flat-shaped lower surface in the first and second embodiments described above, the third embodiments does not require the recess 241 to have such a flat-shaped lower surface due to the configuration as described above. As a result, the guide piece 200 is securely prevented from being separated from the guide plate 100 without using the protrusions 103 on the front and rear surface of the guide plate 100.

Since a method for manufacturing the guide anchor for the seat belt in accordance with the present embodiment is the same as that of the second embodiment, detailed description thereof will be omitted herein.

As apparent from the above description, according to the present invention, a recess is formed to a second molded part so as to be fitted onto a guide plate, thereby allowing easy assembly as well as lower frequency of defective products by an accurate molding process.

Cover eaves are extended from a lower portion of a cover, thereby enabling easier and stronger engagement between the cover and a first molded part.

The lower end of each cover eave is inwardly bent, and supports a lower lateral edge of the second molded part, thereby preventing the second molded part from being separated from the cover.

Both longitudinal ends of each cover eave contact and support transverse ribs of the second molded part, thereby preventing the second molded part from being separated from the cover in the longitudinal direction.

The cover has latching grooves formed on a rear side thereof, thereby more effectively preventing the second molded part from being separated from the cover in the longitudinal direction.

The longitudinal ends of each cover eave and the second molded part are cut to a predetermined length, thereby preventing an increase in volume of the guide anchor due to the cover eaves.

When protrusions are formed on the surface of the second molded part exposed through frictional openings in the cover, the protrusions are partially demolished due to weights of the seat belt and a passenger upon collision, thereby partially absorbing impact.

When a side of the second molded part is finished in an exposed state, a frictional force of the belt is increased, thereby more effectively reducing a tendency of the belt to bias towards one side upon collision.

The recess of the second molded part is alternately formed at a lower surface with convex portions and depressions in the longitudinal direction, and is fitted onto the guide plate alternately formed with concave portions and ridges, thereby allowing easy assembly as well as lowering frequency of defective products by an accurate molding process through a firm temporary engagement.

Moreover, the convex portions of the second molded part are taller than the ridges of the guide plate, so that the convex portions of the second molded part are partially demolished upon collision, thereby absorbing the impact.

It should be understood that the embodiments and the accompanying drawings have been described for illustrative purposes and the present invention is limited only by the following claims. Further, those skilled in the art will appreciate that various modifications, additions and substitutions are allowed without departing from the scope and spirit of the invention as set forth in the accompanying claims.

What is claimed is:

1. A guide anchor for a seat belt of a vehicle, the guide anchor comprising a guide plate having a latching hole and a slide guide hole formed therein, a guide piece engaged with a lower circumference of the slide guide hole, and a first molded part for coupling the guide plate and the guide piece, wherein the guide piece comprises a cover, made of a metallic material and a second molded part formed under a lower surface of the cover, wherein the second molded part has a recess formed on a bottom surface in the longitudinal direction so as to be fitted onto the guide plate, the recess being alternately formed with convex portions and depressions in the longitudinal direction on a lower surface thereof, and the slide guide hole of the guide plate is alternately formed at a lower circumference with concave portions and ridges to be fitted to the convex portions and the depressions in the longitudinal direction, wherein the convex portions of the second molded part are taller than the ridges of the guide plate to form a gap between the ridges and the depressions.

2. The guide anchor according to claim 1, wherein the convex portions and the depressions formed on the lower surface of the recess of the second molded part are fitted into the concave portions and the ridges of the guide plate, respectively.

* * * * *